United States Patent [19]

ver der Lely et al.

[11] Patent Number: 4,903,538
[45] Date of Patent: Feb. 27, 1990

[54] DRIVE HOUSING FOR A MOWING MACHINE

[75] Inventors: Edwin ver der Lely, Maasland; Cornelis J. Gerardus, Rozenburg, both of Netherlands

[73] Assignee: C. van der Lely N.V., Maasland, Netherlands

[21] Appl. No.: 94,386

[22] Filed: Sep. 8, 1987

Related U.S. Application Data

[62] Division of Ser. No. 772,465, Sep. 4, 1985, Pat. No. 4,693,062.

[30] Foreign Application Priority Data

Jan. 4, 1984 [NL] Netherlands ................. 8400028

[51] Int. Cl.⁴ .................. F16H 1/14; F16H 57/02; A01D 34/43
[52] U.S. Cl. .......................... 74/417; 56/13.6; 74/423; 74/606 R; 184/6.12
[58] Field of Search ............. 74/417, 423, 424, 606 R; 56/6, 13.6; 184/6.12

[56] References Cited

U.S. PATENT DOCUMENTS

| | | | |
|---|---|---|---|
| 2,997,894 | 8/1961 | Klein | 74/423 X |
| 3,550,360 | 12/1970 | van der Lely | 56/6 |
| 3,774,466 | 11/1973 | Bhatia et al. | 74/417 |
| 3,965,658 | 6/1976 | van der Lely | 56/6 X |
| 3,974,630 | 8/1976 | van der Lely | 56/6 X |
| 4,020,715 | 5/1977 | Sollars | 74/606 R |
| 4,147,227 | 4/1979 | van der Lely | 180/77 C |
| 4,166,350 | 9/1979 | Werner | 56/13.6 X |
| 4,197,692 | 4/1980 | Weber | 56/13.6 |
| 4,199,922 | 4/1980 | van der Lely | 56/13.6 |
| 4,299,077 | 11/1981 | Wattron | 56/13.6 |
| 4,506,562 | 3/1985 | Yamaura et al. | 74/606 R |

FOREIGN PATENT DOCUMENTS

| | | |
|---|---|---|
| 74695 | 3/1983 | European Pat. Off. . |
| 1782946 | 1/1971 | Fed. Rep. of Germany . |
| 2552347 | 7/1976 | Fed. Rep. of Germany . |
| 2730146 | 1/1978 | Fed. Rep. of Germany . |
| 2838420 | 3/1979 | Fed. Rep. of Germany . |
| 89970 | 9/1967 | France . |
| 2358819 | 2/1978 | France . |
| 2509117 | 1/1983 | France . |
| 7804724 | 11/1978 | Netherlands . |
| 1343031 | 1/1974 | United Kingdom . |
| 1460224 | 12/1976 | United Kingdom . |
| 2068206 | 8/1981 | United Kingdom ............. 56/13.6 |
| 2068703 | 8/1981 | United Kingdom . |
| 1600450 | 10/1981 | United Kingdom . |
| 1604891 | 12/1981 | United Kingdom . |
| 2081565 | 2/1982 | United Kingdom . |

Primary Examiner—Allan D. Herrmann
Attorney, Agent, or Firm—Penrose Lucas Albright; Robert A. Miller

[57] ABSTRACT

A mowing machine has a plurality of drive housings that are associated with the cutting units. Each unit has a carrying shaft that rotates a carrying unit which includes a carrying arm, cutting blades, and a covering disc. The carrying shaft is connected by gearing, located within the sealed drive housing, to the mowing machine's drive shaft. When the machine is in operation, the resulting friction within the drive housing causes the lubricants and air therein to expand. A channel is provided in the carrying shaft that opens at its lower end into the drive housing and at its upper end at the top of the carrying shaft under a conically configured cup spring, into a space which is not sealed from ambient pressures. The channel thus functions as a pressure vent to the otherwise sealed drive housing and permits the lubricants and air therein readily to expand and contract. The cup spring protects the channel from receiving any substantial amounts of dust or like contaminants in the air in the vicinity of the mowing machine.

6 Claims, 7 Drawing Sheets

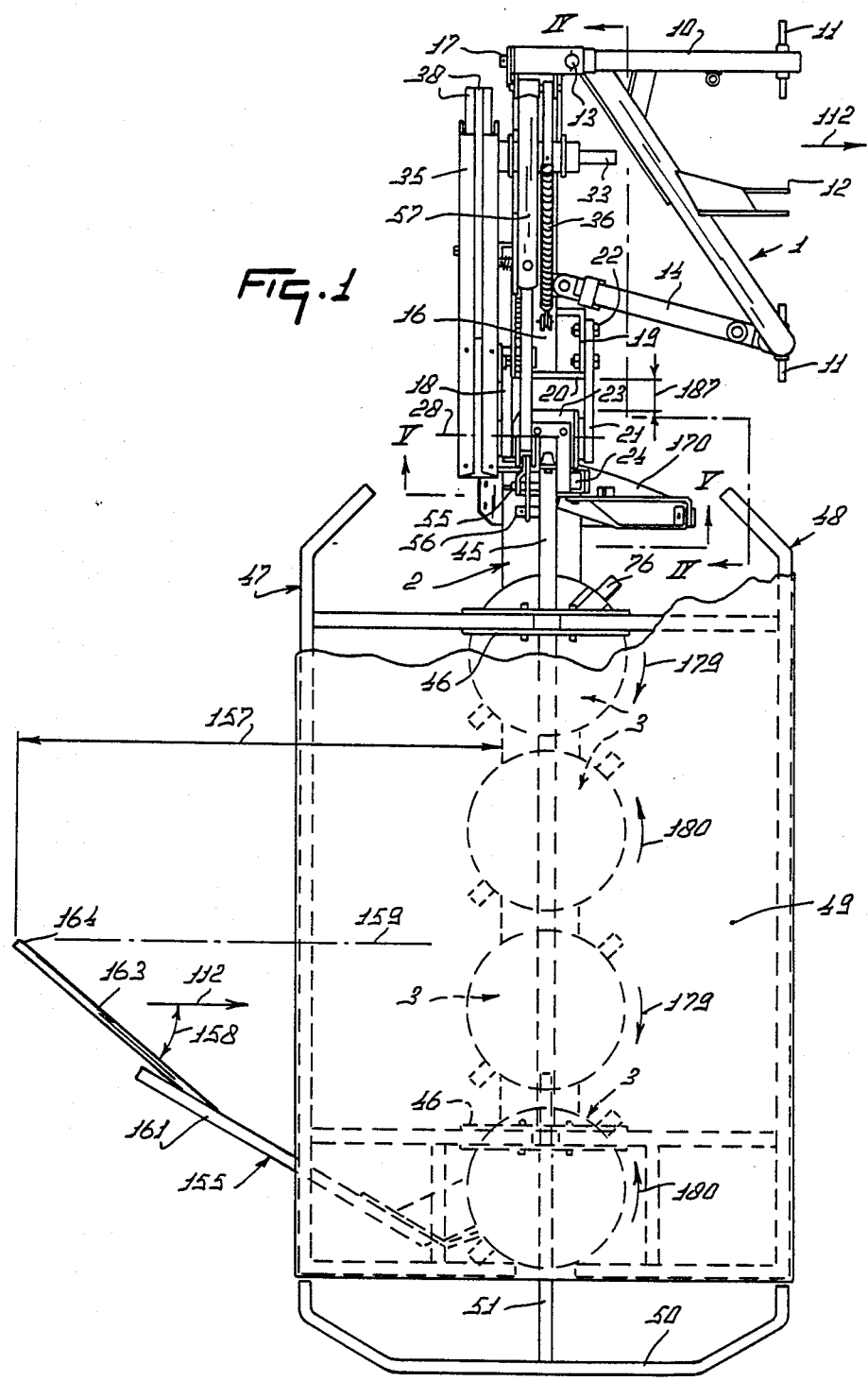

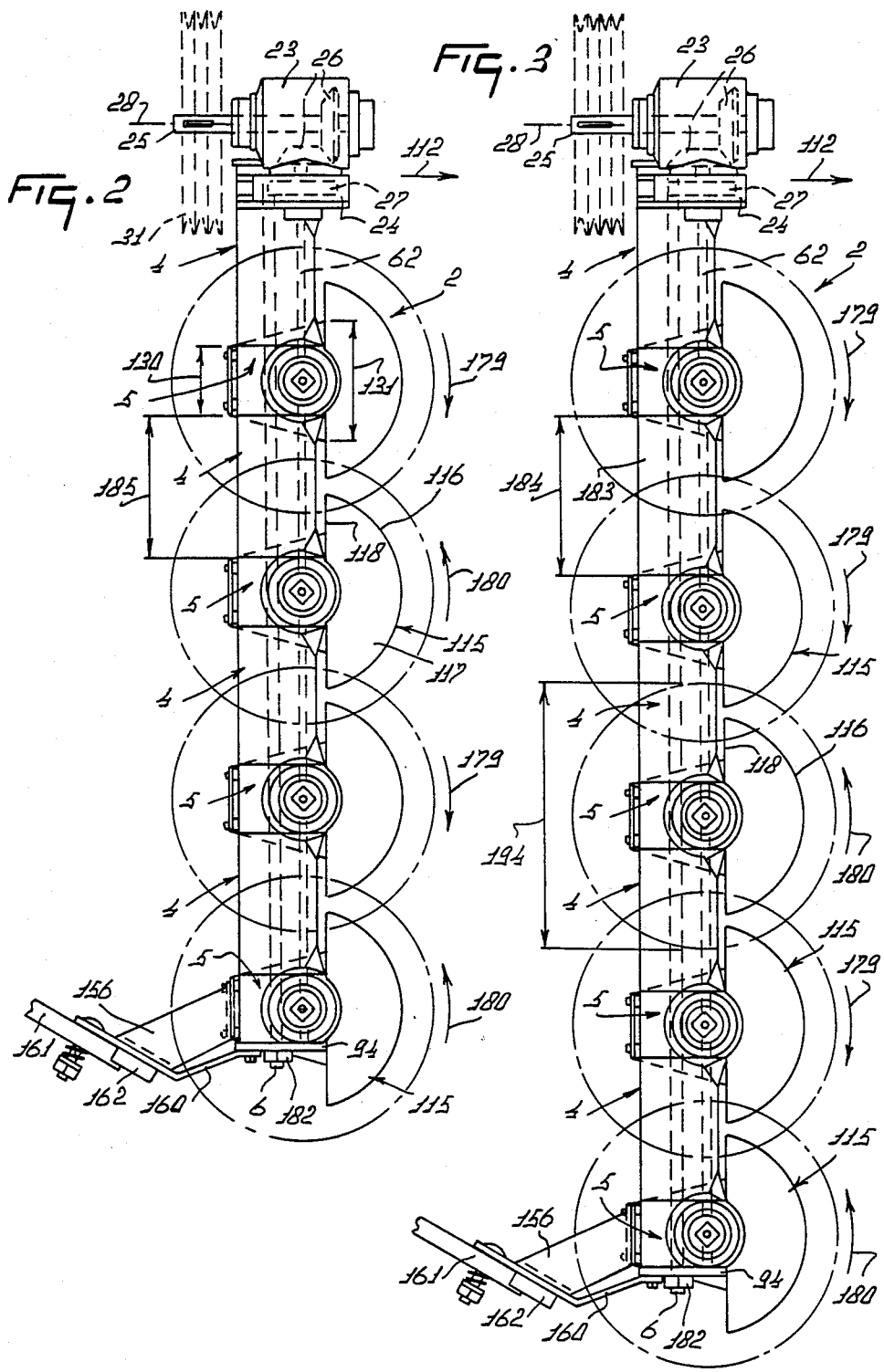

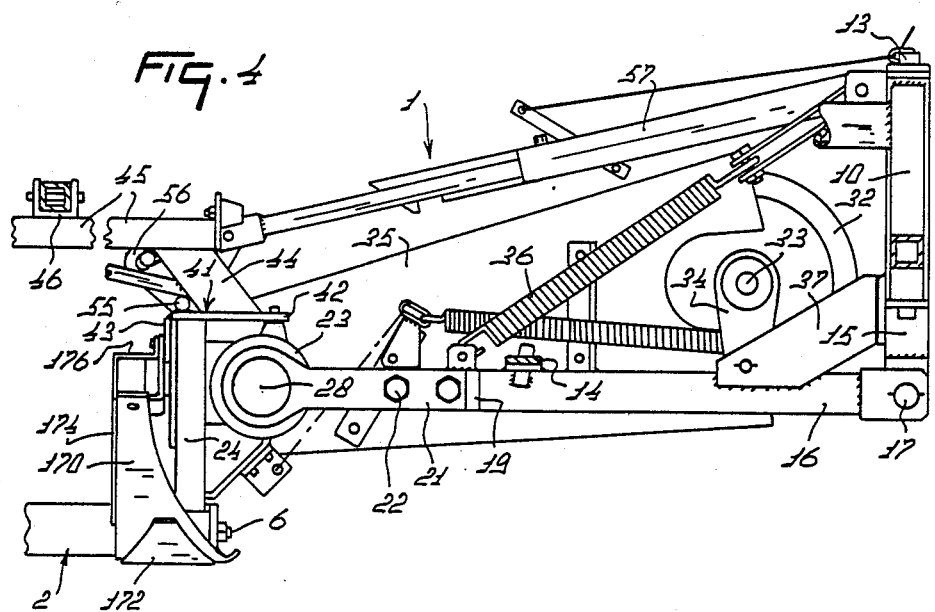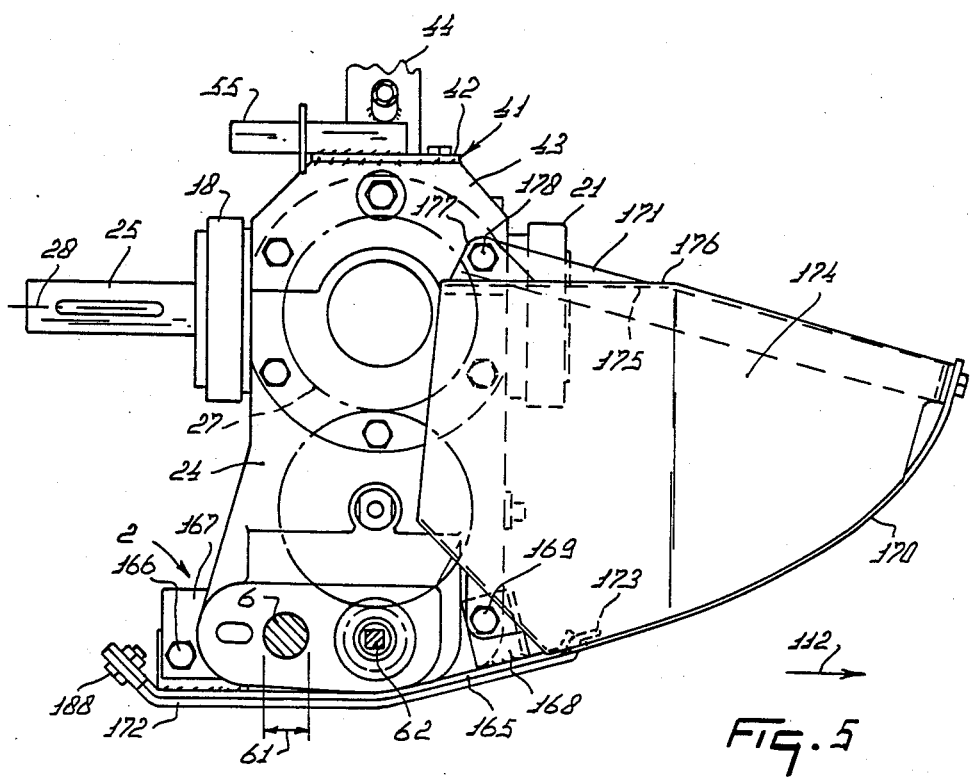

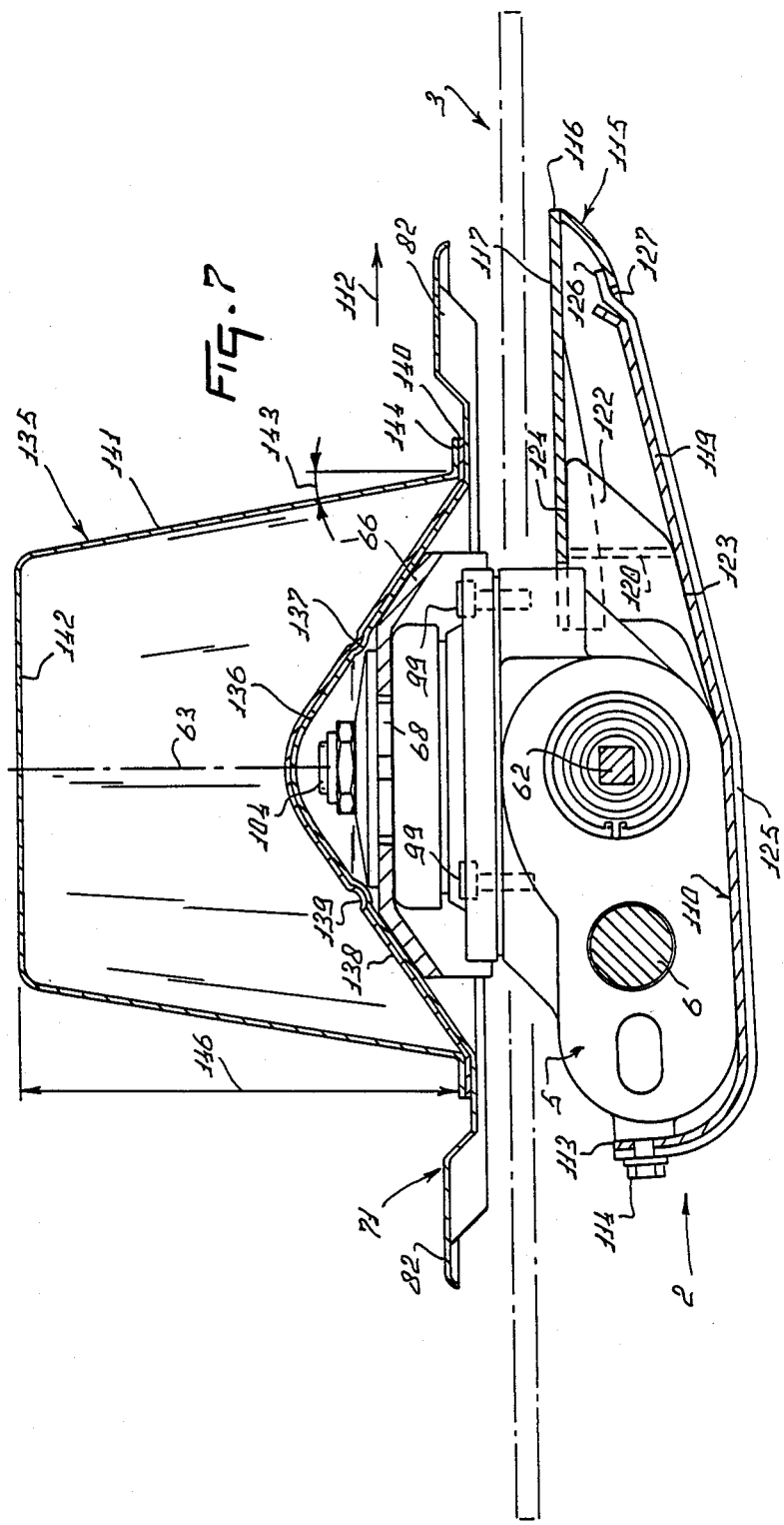

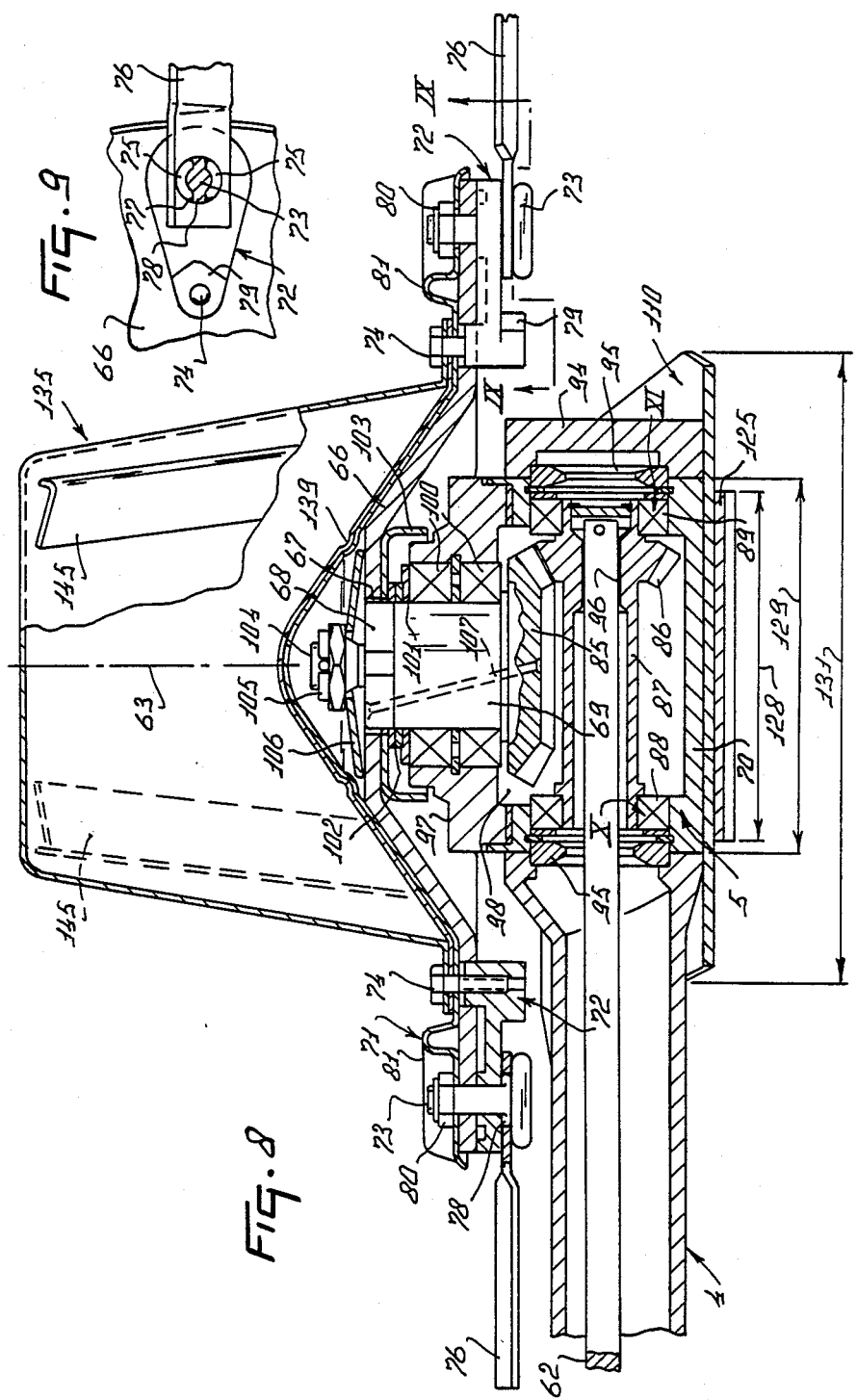

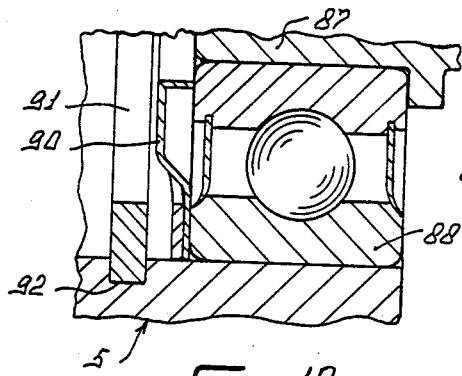
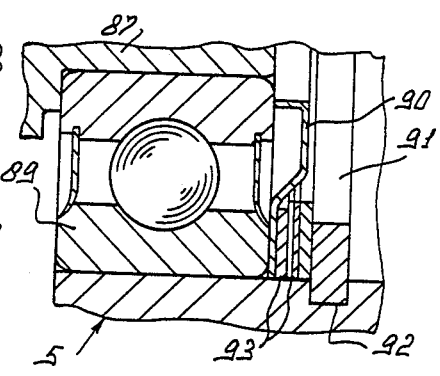
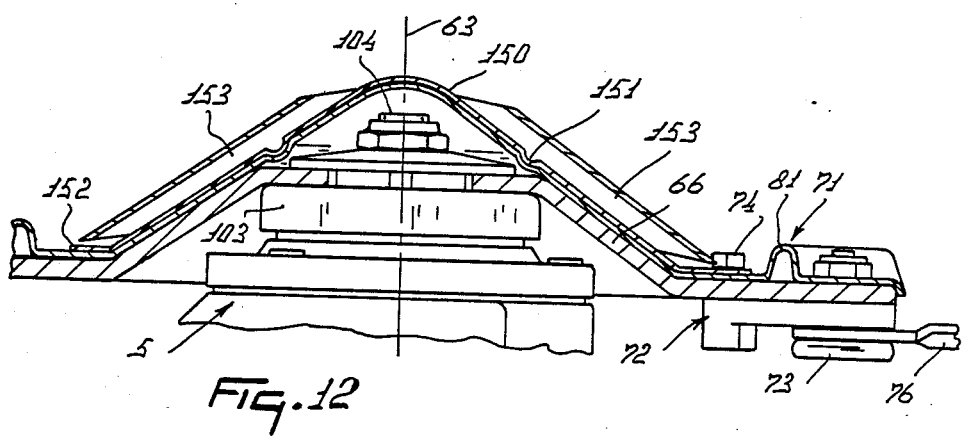
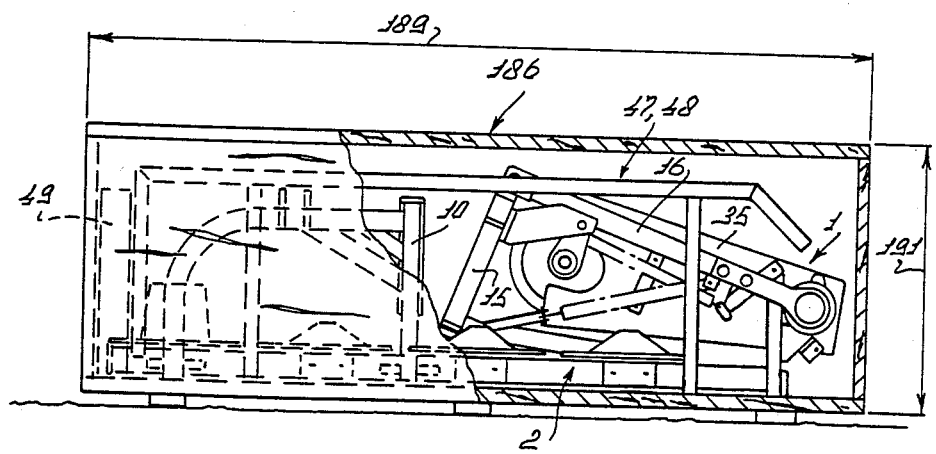

4,903,538

DRIVE HOUSING FOR A MOWING MACHINE

RELATED APPLICATION

This application is a division of U.S. patent application Ser. No. 772,465 filed Sept. 4, 1985 for A MOWING MACHINE of Edwin Van Der Lely et al, U.S. Pat. No. 4,693,062, of Sept. 15, 1987.

SUMMARY OF THE INVENTION

This invention relates to a mowing machine for mowing crop, comprising a cutter bar having a cutting unit which is rotatable about an upwardly extending rotary axis.

According to the present invention an engaging member is releasably provided on the upper face of the cutting member. The engaging member can be fitted to the cutting unit to assist the displacement of the crop over and across the cutting units and the cutter bar to the rear, particularly when mowing crop which tends to pass less easily over the cutting units and the cutter bar. The mowing machine can be used without the engaging members when mowing crop which passes easily over the cutting units and the cutter bar to the rear during the operation of the mowing machine.

An advantageous embodiment of the mowing machine in accordance with the invention is obtained when the engaging member is fastened to a supporting member or body, which is releasably mounted on the cutting unit.

In a further embodiment of the mowing machine in accordance with the invention the engaging member has a V-shaped section, the ends of the limbs being rigidly secured to the body. The resulting shape of the engaging member has an advantageous effect on the displacement of the cut crop over and across the cutting units and the cutter bar.

In another aspect of the present invention, the cutting unit is movably arranged on a carrying shaft journalled in the cutter bar and extending upwards therefrom. The cutting unit is slightly movable with respect to the rotary shaft when encountering obstacles. In this way damage to the cutting unit and other components of the mowing machine is avoided.

A further advantageous embodiment is obtained when the cutting unit is resiliently mounted on the top end of the carrying shaft.

A simple construction is obtained when the cutting unit comprises a carrying arm having an angled opening which fits, with clearance, around an angled top end of the carrying shaft of the cutting unit, the carrying arm being tiltable about the top end of the carrying shaft.

A mowing machine embodying the present invention can be advantageously constructed by fastening the cutting unit to a carrying shaft journalled in a drive housing of the cutter bar, which cutter bar is assembled from intermediate pieces and drive housings interconnected by a tie rod.

An advantageous support for the cutter bar of the mowing machine is obtained by providing the drive housing with a supporting skid which is rigidly secured to the rear of the drive housing, with respect to the normal direction of operative travel of the mowing machine, the front of the supporting skid being coupled with the drive housing by a nose provided on the drive housing and engaging a recess of the supporting skid. In this way the supporting skid can be readily fastened to the driving housing. The connection at the rear of the housing is unlikely to be damaged during operation. The supporting skid can furthermore be readily removed for replacement, if necessary, by a different supporting skid.

In a further embodiment of the mowing machine in accordance with the invention the cutter bar is fastened at its inner end to a gear box, to which a support frame is connected, by means of which the mowing machine can be coupled with the lifting device of a tractor or similar vehicle. The support frame can turn with respect to the cutter bar about a pivotal axis which is substantially normal to the length of the cutter bar and the support frame is connected with the gear box by means of a forked member which can turn over and across the gear box for turning at least part of the supporting frame over and across the gear box to a position above the cutter bar. The mowing machine can thus be reduced in its overall dimensions, which is particularly advantageous when shipping the mowing machine.

For a better understanding of the present invention and to show how it may be carried into effect, reference will now be made, by way of example, to the accompanying drawings, in which:

BRIEF DESCRIPTION OF THE DRAWINGS

FIG. 1 is a plan view of a mowing machine in accordance with the invention;

FIG. 2 is an enlarged plan view of part of the mowing machine of FIG. 1;

FIG. 3 corresponds to FIG. 2 but shows a different embodiment;

FIG. 4 is an enlarged view of part of the mowing machine taken on the line IV—IV in FIG. 1;

FIG. 5 is an enlarged view of part of the mowing machine taken on the line V—V in FIG. 1;

FIG. 7 is an enlarged sectional view taken on the line VII—VII in FIG. 6;

FIG. 8 is a sectional view taken on the line VIII—VIII in FIG. 6;

FIG. 9 is a view taken on the line IX—IX in FIG. 8;

FIG. 10 is an enlarged sectional view of the detail indicated in FIG. 8 by the arrow X;

FIG. 11 is an enlarged sectional view of the detail indicated in FIG. 8 by the arrow XI;

FIG. 12 is a sectional view taken on the line XII—XII in FIG. 6; and

FIG. 13 is a partly sectioned view of the mowing machine packed, in a collapsed condition, in a crate for transit.

DESCRIPTION OF THE PREFERRED EMBODIMENTS

Figure 6:
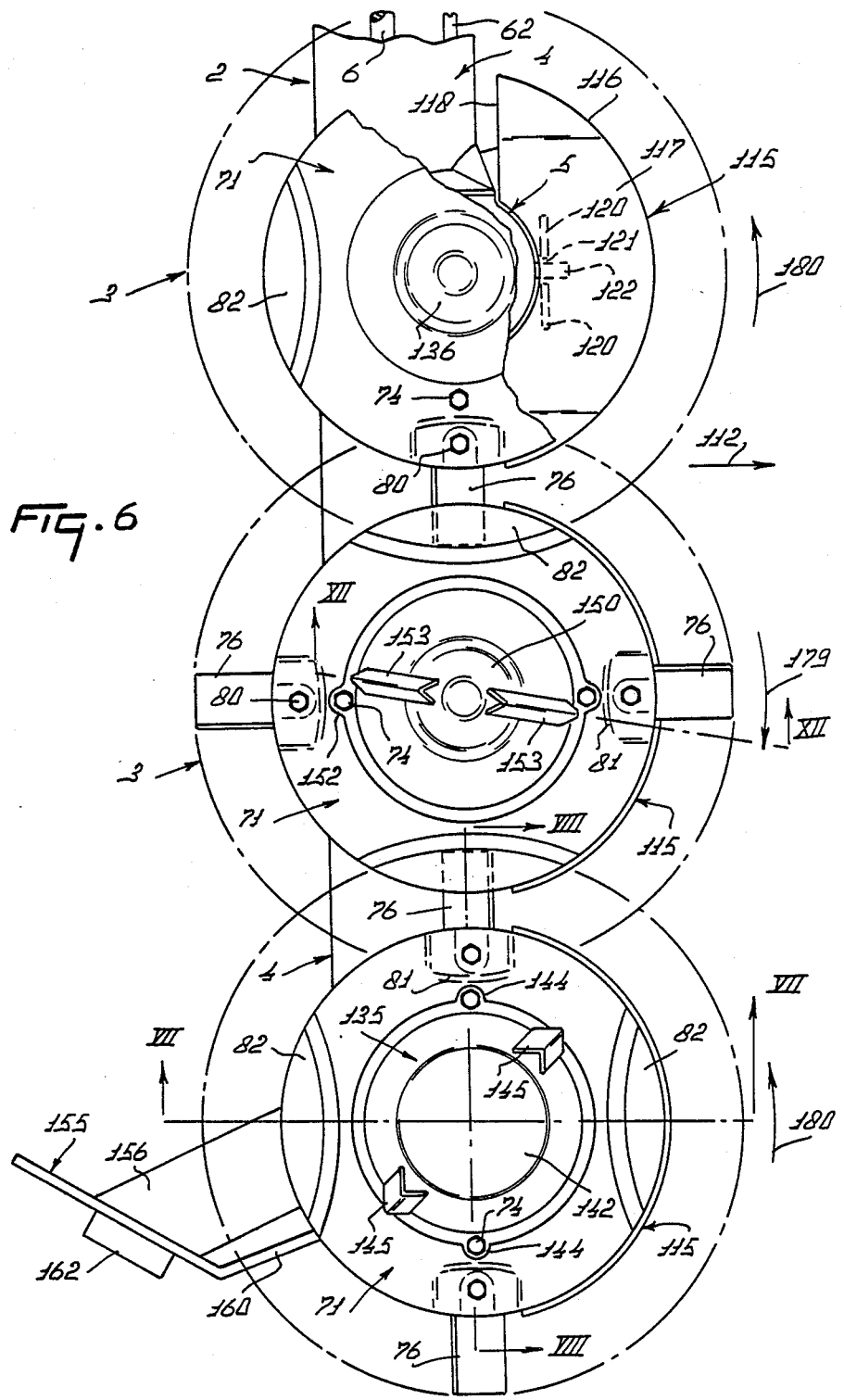
FIG. 6 is an enlarged plan view showing three cutting members of the mowing machine.

The mowing machine shown in the drawings comprises a support frame 1 carrying a cutter bar 2. The cutter bar 2 is provided with a plurality of cutting units 3 arranged in a row. The cutter bar is assembled from intermediate pieces 4 and drive housings 5, which are held together by a tie rod 6.

The support frame 1 comprises a mounting trestle 10 provided with coupling pins 11 and coupling lugs 12 for hitching the frame 1 to the three-point lifting device of a tractor or similar vehicle. The trestle 10 is connected by an upwardly extending pivotal shaft 13 to a vertical frame beam 15. The vertical frame beam 15 is connected to a carrying arm 16 by a pivotal shaft 17 which extends substantially in the normal direction of operative travel of the mowing machine, as indicated by an arrow 112. The trestle 10 is also connected to the carrying arm 16 by a shear mechanism 14. At the end of the carrying arm 16 away from the pivotal shaft 17 there is a fork arm 18. On the opposite side of the carrying arm 16 from the fork arm 18, a bracket 19 is fastened to the arm 16. A strip 20 is fastened to the end of the carrying arm 16 and extends between the bracket 19 and the fork arm 18. A fork arm 21 is secured by bolts 22 to the bracket 19. The fork arms 18 and 21 are situated on opposite sides of a bearing housing 23, which is connected with a gear box 24. The cutter bar 2 is fastened to the lower end of the gear box 24.

The fork arms 18 and 21 can turn about the center line 28 of a drive shaft 25 which is journalled in the bearing housing 23. The bearing housing 23 contains meshing bevel gear wheels 26 which drive two meshing spur gear wheels 27 in the gear box 24. The drive shaft 25 carries a pulley 31 which is connected by three belts 38 to a pulley 32. The pulley 32 is mounted on a shaft 33 which is journalled in a supporting lug 34 fastened to the carrying arm 16. The pulley 31 and the belts 38 are surrounded by a protective casing 35.

A tension spring 36 acts between the top of the frame beam 15 and the carrying arm 16. A stop 37 fixed to the carrying arm 16 limits the movement of the carrying arm 16 about the pivotal shaft 17 with respect to the beam 15.

An angled support 41 is secured to the top of the bearing housing 23 and the gear box 24 and comprises a top plate 42 and a side plate 43. A support 44 is fastened to the top plate 42 and is provided with a carrier 45 for a fabric screen 49. The carrier 45 extends parallel to and above the cutter bar 2. The carrier 45 is provided with supports 46 to which rails 47 and 48 are fastened, over which the fabric screen 49 is arranged. The end of the carrier 45 away from the supporting frame 1 is provided with a protective bar 50 having a fastening rod 51 which is releasably fastened in the hollow end of the carrier 45. The top plate 42 and the support 44 are provided with a substantially horizontal pin 55, about which a coupling segment 56 is rotatable. A lifting cylinder 57 acts between the coupling segment 56 and the top of the frame beam 15.

The mowing machine shown in FIG. 2 comprises four cutting units 3. The cutter bar 2 comprises four identical intermediate pieces 4 and four identical drive housings 5. The intermediate pieces 4 and the drive housings 5 are held together by the tie rod 6 and are fastened to the lower end of the gear box 24. The tie rod 6 is solid (i.e. continuous) and has a circular section with a diameter 61 (FIG. 5) of thirty milimeters. FIG. 3 shows an embodiment having five cutting units 3. An integral continuous drive shaft 62 extends through the intermediate pieces 4 and the drive housing 5. The drive shaft 62 has an angular cross-section which, in the illustrated embodiment, is square. The drive shaft 62 is journalled at one end in the underside of the gear box 24, where it is in mesh, via a small spur gear with the lower gear wheel 27 as shown in FIG. 5.

Each drive housing 5 carries a cutting unit 3. The cutting units 3 are rotatable about upwardly extending rotary axes 63, which are vertical in the horizontal working position of the mowing machine. The rotary axes 63 of all of the cutting units lie in the same plane which contains the centerline of the drive shaft 62. The construction of the drive housings 5 is shown in detail in FIGS. 7 to 10 for the drive housing located at the outermost end of the cutter bar 2. These figures and FIGS. 6 and 12 also show in detail the construction of the cutting units.

Each cutting unit 3 comprises a carrying arm 66, which extends for equal distances to both sides of the rotary axis 63. The carrying arm 66 has an angular (shown square) opening 67 which receives, with some clearance, a correspondingly shaped top end 68 of a carrying shaft 69 journalled in the drive housing 5. On top of the carrying arm 66 there is a disc 71, which is circular, as viewed on plan, with its center line coincident with the rotary axis 63. Blade carriers 72 are provided on the undersides of the ends of the carrying arm 66. The blade carriers 72 and the disc 71 are fastened to the carrier 66 by flat-headed bolts 73 and machine bolts 74, the centerlines of which lie in a vertical plane containing the rotary axis 63. The machine bolts 74 are nearer the rotary axis 63 than the flat-headed bolts 73. The blade carriers 72 have projections 75 (FIG. 9) on their lower faces, about which cutting blades 76 are rotatable. The projections 75 define recesses 77 which receive lugs 78 on the bolts 73, so that the bolts 73, when inserted, cannot turn. Each blade carrier 72 has a stop 79. The bolts 73 are secured in place by nuts 80. The disc 71 has a raised ridge 81 which extends around the bolt 73 and its nut 80 to the periphery of the disc 71. The machine bolt 74 is on the opposite side of the ridge 81 from the nut 80. Each cutting unit 3 is provided with two cutting blades 76, which are diametrically opposite each other with respect to the axis 63. At the periphery of the disc 71 and midway between the two cutting blades 76 on each cutting unit 3, the disc 71 has upwardly bulging parts 82, which, in the illustrated embodiment, are offset about the axis 63 through 90° with respect to the blades 76.

The shaft 69 has at its lower end a bevel gear wheel 85 which co-operates with a bevel gear wheel 86 rotationally fixed to the drive shaft 62. The bevel gear wheel 86 is part of a sleeve 87 journalled in bearings 88 and 89 in the wall 70 of the drive housing 5. The space between the sleeve 87 and the inner side of the wall 70 is sealed from the outside by closing elements 90 provided on the outer side of the bearings 88 and 89. The bearing 89 bears in the axial direction on a ring 91, which lies in a groove 92 in the wall 70. One or more spacer rings 93 can be provided, if necessary between the bearing 89 and the ring 91 to ensure correct location of the bearing 89 in the housing and satisfactory meshing of the teeth of the bevel gear wheels 85 and 86. Near the bearing 88 a further ring 91 lies in a groove 92 in the wall 70 to locate the sleeve 87 in the housing 70. The bores in the wall 70 adjoining the adjacent intermediate pieces 4 or a closing plate 94 are provided with alignment rings 95. Near the gear wheel 86 the sleeve 87 has a hole 96 which corresponds to the section of the shaft 62 and in which the shaft 62 fits. The remaining length of the sleeve 87 may surround the shaft 62 with ample clearance and its sectional shape need not correspond to the section of the shaft 62.

The carrying shaft 69 is journalled in bearings 100 supported in a cover 97 of the drive housing 5, which cover lies over an upper opening 98 in the wall 70 and is rigidly secured by bolts 99 to the wall 70. The bearings 100 in the cover 97 are covered at the top by a closing ring 101. The closing ring 101 is provided with one or more spacer rings 102, on which a closing hood 103 is arranged. The closing hood is rotatable by an opening (not shown) with the carrying shaft 69 about the top end 68 of the carrying shaft. The carrying arm 66 lies on the closing hood 103. The carrying shaft 69 has a screwthreaded end 104 which receives a nut 105. Between the nut 105 and the top of the carrying arm 66 there is a resilient ring member comprising a cup spring 106 which urges the carrying arm 66, the hood 103 and the rings 101 and 102 firmly against the parts of the upper bearing 100 which rotate with the shaft 69. The nut 105 and the cup spring are situated below the central part of the disc 71 covering the whole length of the carrying arm 66.

The carrying shaft 69 has a channel 107 opening at one end near the rotary axis 63 in the interior of the drive housing 5. The other end of the channel 107 opens at the top end of the carrying shaft to below the cup spring 106 at a position away from the axis 63.

Below each carrying shaft 69, beneath the cutter bar, there is a supporting skid 110. The skids 110 are situated mainly below the drive housings 5 and are secured to them. The rear edge of each skid 110 has a width 130, which is substantially equal to the width of the drive housing 5. The width of the skid widens to the front to become equal to the width 131 near the front of the cutter bar 2. At the rear of the cutter bar 2, viewed with respect to the direction 112, the supporting skids are provided with upwardly directed parts 113, which are fastened by bolts 114 to the housing 5. The supporting skids are provided with segment-shaped protective members 115 disposed in front of the cutter bar with respect to the direction 112. The outer periphery 116 of each member 115 is centered on the rotary axis 63 of the cutting member concerned. The outer periphery 116 of each protective member 115 is situated approximately directly below the circumferential edge of the disc 71 and extends radially beyond the bolt 73 which connects the blade to the carrier arm 66. At the top, the protective member 115 has a plate 117 which is parallel to the plane in which the cutting blades 76 move. The rear edge 118 of the plate 117 adjoins the drive housing 5 and extends at the side of the drive housing 5 to positions near the front of each intermediate piece 4. Between the top plate 117 and a bottom plate 119 of the skid 110, there are two spaced support plates 120 which extend, as viewed on plan, parallel to the lengthwise direction of the cutter bar 2 (FIG. 6). A gap 121 is left between the supporting plates 120, in which fits a nose 122 on the front of the drive housing 5. The height of the nose 122 is such that its lower edge 123 contracts the top of the bottom plate 119 of the supporting skid 110, and its top edge 124 contacts the underside of the top plate 117.

The underside of the supporting skid 110 is provided with a sliding shoe 125, the rear end of which is fastened by the bolts 114 to the rear of the housing 5. The front edge of the sliding shoe 125 has an upwardly deflected lug 126 which fits into a hole 127 in the bottom plate 119 of the protective member 115. The sliding shoe 125 is narrower than the supporting skid 110 and has a width 128, which is slightly smaller than the width of the drive housing 5. At the front, the supporting skid 110 has a width 131 equal to about twice the width 129 of the housing 5.

The cutting unit 3 farthest from the support frame 1 is provided with an upwardly extending body 135 in the form of a drum. The body 135 has a continuous bottom plate 138, which has the same shape at the top of the disc 71. The disc 71 has a central, upwardly extending, conical part 136 having an annular depression 137. The bottom plate 138 of the body 136 fits over the central part 136 and is centered and lightly secured thereon by an annular depression 139 which engages the depression 137. At its periphery, the bottom plate 138 is provided with protruding lugs 140. An upwardly tapering conical jacket 141 is supported on the bottom plate 138 and has a top plate 142 extending at right angles to the rotary axis 63. The jacket 141 tapers at an angle 143 of about 10° to the rotary axis 63. The lower edge of the jacket 141 has two protruding lugs 144 which have the same size as and match the top faces of the lugs 140. The lugs 140 and 144 have openings which are in register with holes in the disc 71 and through which the machine bolts 74 pass to secure the supporting member 135 with the disc 71 to the carrying arm 66. The conical jacket 141 is provided with two engaging members 145 having an angled, V-shaped section comprising two limbs, the outer ends of the limbs being welded or otherwise appropriately fastened to the jacket 141 or fastened to it in a different. The two engaging members 145 are diametrically opposite each other with respect to the rotary axis 63. The height 146 of the body 135 is not critical; in the illustrated embodiment it is approximately equal to the distance between the underside of the skid 110 and the top side of the carrying shaft 69, i.e. about fifteen centimeters.

The cutting units 3 other than the outermost cutting unit of the row may be provided with bodies 150 provided with engaging members 153. One such body is shown in FIG. 6, on the penultimate cutting unit 3 of the row and in FIG. 12 in a sectional view. The body 150 mainly comprises a conical plate having an annular depression 151 which engages the depression 137 of the disc 71. The body 150 has substantially the same shape as the conical, central parts 136 of the discs 71 and has lugs 152 by means of which the body 150 is secured with the disc 71, to the carrying arm 66 by the bolts 74. The body 150 is substantially identical to the bottom plate 138 of the body 135. The body 150 is provided with diametrically oppositely disposed engaging members 153 which, like the engaging members 145 of the body 135, have angled, V-shaped sections, the ends of the limbs being fastened to the upper surface of the body 150.

The drive housing 5 at the outermost end of the cutter bar 2 is provided with a swath guide 155. The swath guide 155 is fastened by means of a plate 156 to the rear of the housing 5 using the bolts 114 which also secure the supporting skid 110 to the housing 5. The swath guide 155 comprises a cranked supporting plate 160, which is fastened to the closing plate 94. The plate 160 has a fastening element 162, to which is fastened a guide plate 161 provided with a guide bar 163. The guide bar 163 is inclined inwardly of the direction 112 at an angle 158. The end 164 of the guide bar 163 lies in a vertical plane 159 extending in the direction 112 and going at least substantially through the side of the penultimate cutting unit facing the support frame 1. The end 164 lies at a distance 157 of about 115 centimeters behind the cutter bar 2. The guide bar 163 slopes slightly upwardly away from the guide plate 161.

Near the junction of the cutter bar 2 with the gear box 24 there is a supporting inner skid 165 which is disposed below the gear-box 24 and the adjacent intermediate piece 4. This inner skid is fastened by bolts 166 to a lug 167 secured to the rear of the gearbox 24. In front of the gearbox 24, the skid 165 has a lug 168, which is rigidly secured by a bolt 169 to the gearbox 24.

The inner skid 165 has a curved part 170 which extends approximately up to the height of the drive shaft 25. The top end of the curved part 170 is connected by means of a strip 171 to the gearbox 24. Like the supporting skid 110, the inner skid 165 is provided with a sliding shoe 172, the rear edge of which is fastened by bolts 188 to the rear of the skid. The front of the sliding shoe 172, there is a lug 173 corresponding with the lugs 126 and engaging a hole (not shown) in the inner skid 165 corresponding with the holes 127.

A screening plate 174 is provided along one side of the inner skid 165. The screening plate 174 has a lower edge adjoining the curved part 170 of the inner skid 165. The top edge 175 of the plate 174 extends between the top end of the part 170 and the gearbox 24, where the top edge 175 adjoins the gearbox slightly above the centerline 28 of the shaft 25. The top edge 175 has a horizontal part 176 with a lug 177, which is fastened, with the strip 171, to the gearbox 24 by a bolt 178. The screening plate 174 is substantially at right angles to the lengthwise direction of the cutter bar 2.

For operation, the mowing machine is coupled by the pins 11 and the lugs 12 of the fastening trestle 10 to the lifting device of a tractor or similar vehicle. The shaft 33 is connected by an auxiliary shaft with the power take-off shaft of the tractor.

During operation the mowing machine is moved in the direction 112, the cutter bar 2 extending transversely of this direction. The cutting units 3 cut crop in a strip lying at the side of the tractor to which the mowing machine is hitched, as viewed in the direction 112. The cutting units are rotated in the directions indicated by the arrows 179 and 180 in FIG. 2. The cutting units are driven from the shaft 33 via the pulleys 32 and 31, the gear wheels 26 and 27 and the drive shaft 62. The drive shaft 62 extends from the gearbox 24 through the intermediate pieces 4 and the drive housings 5. The drive shaft 62 is connected to drive the gear wheels 86 in the drive housings 5 by means of the polygonal section of the drive shaft and the corresponding polygonal openings 96 in the sleeves 87. From the gear wheels 86, via the gear wheels 85, the rotary shafts 69, on which the cutting units are fastened by means of the carriers 66, are rotated. The cutting units are driven so that the innermost cutting unit, i.e. the one nearest the support frame 1, rotates about its rotary axis 63 in a direction 179, in which at the front, the cutting member moves away from the support frame 1. Where there is an even number of cutting units, for example four cutting units as shown in FIG. 2, the other cutting units are driven so that adjacent cutting units rotate in opposite senses to each other. The cutting units thus form pairs rotating in opposite senses in the directions of the arrows 179 and 180. The regions of closest approach of the cutting units of each pair will move to the rear with respect to the direction 112. When the cutter bar has an odd number of cutting units, for example five as shown in FIG. 3, the direction of rotation of the cutting units is selected so that the two cutting members nearest the support frame 1 rotate in the same direction 179 as each other about their rotary axes. In order to prevent the cutting blades of these two cutting units from contacting in an undesirable manner, they are spaced apart by an intermediate piece 183, disposed between the two driving housings 5 of the cutting units concerned, which is longer than the other intermediate pieces 4. The other adjacent pairs of cutting units rotate in opposite senses during operation of the mowing machine. By causing the first and the second cutting units of the row to rotate in the same direction when there is an odd number of cutting units, the second cutting unit and the remaining cutting unit can co-operate in pairs moving in opposite senses so that the outermost cutting unit rotates in the desired manner in the direction of the arrow 180. This direction of rotation 180 is desired in order to enable crop to be deposited in a swath on the cutter bar by the rotation of the outermost cutting unit. The edge of the swath, as viewed in the direction 112, is some distance from the end of the cutter bar so that a strip of ground is left free of crop at the side of the swath. The direction of rotation 179 of the innermost cutting unit is desired to ensure that, near the inner end of the cutter bar, the crop can move over and across it without accumulating in front of the gearbox 24 and the inner skid 165.

The screening plate 174 is provided on the inner skid 165 in order to prevent cut crop from moving towards the carrying frame 1 over the top of the inner skid 165 when cutting high crop. As shown in the Figures, the screening plate 174 is preferably disposed on the side of the inner skid 165 facing the row of cutting units. The length of the mowing machine can be selected simply by assembling the cutter bar from the required number of intermediate pieces 4 and drive housings 5. By using a larger or smaller number of identical drive housings carrying the cutting units and a larger or smaller number of intermediate pieces, the length of the cutter bar and the number of cutting units can readily be altered with uniform components. If the number of cutting units is increased, the pulleys may need to have more grooves, as shown in FIG. 3, in order to transfer the driving force from the shaft 33 to the shaft 25. The section of the drive shaft 62 is selected that it is sufficiently strong to drive more or fewer cutting units. By arranging the outermost cutting member of the row so that it protrudes beyond its drive housing 5, constituting the end of the cutter bar, it is ensured that uncut crop on the strip of soil adjacent the strip being mowed by the mowing machine will not touch the cutter bar, or be otherwise affected by it. The cutter bar is then as short and as inexpensive as possible. During rotation of the cutting units, the blades 76 cut the crop, and the crop then passes over the top of the cutting units to the rear during travel of the mowing machine in the direction 112. This movement is assisted by the rotation of the cutting units, since in particular the rearwardly moving parts of the cutting units push the mown crop to the rear. When the long crop is being mown, it passes over and across the cutting units to the rear substantially throughout the length of the cutter bar. The swath guide 155 at the end of the cutter bar guides the crop slightly inwardly i.e. towards the junction between the cutter bar and the support frame 1. Thus at the side of the formed swath is left a strip of ground free of mown crop. The position of the end of the swath guide is such that the strip of ground has the desired width. In particular the body 135 arranged on the outermost cutting unit, with its engaging members 145 will assist in keeping the strip of ground free of mown crop. This body 135 will displace the crop cut by the outermost cutting unit in the direction of the arrow 180 to pass it to the rear of the cutter bar 2. The engaging members 145 contribute in passing the crop from the cutting unit 135 in the direction of the arrow 180 to the rear of the cutting bar. The engaging members are particularly useful when cutting heavy humid crop, since otherwise the smooth periphery of the drum jacket 141 would be likely to slide along the crop. The height 146 of the body 135 may be larger or smaller than illustrated, for example to suit the kind of crop to be mown by the mowing machine. The depressed rims 139 of the bottom plates 138 ensure satisfactory location of the body 135 on the top of the discs 71.

When the more or less smooth top of the discs 71 of the cutting units cannot grip the crop adequately to assist the movement of the crop over and across the cutter bar, for example when cutting heavy, wet crop, the engaging members 153 can be provided on the top of the cutting units. For this purpose, as is shown in FIGS. 6 and 12, bodies 150 provided with engaging members 153 are fitted to the discs. Depending on the crop to be mown, these bodies 150 can be fitted to or removed from the cutting units. Fitting and removing of the members 150 can be carried out simply by means of the connection via the bolts 74 on the carrier 66 and the discs 71. Satisfactory centering of the bodies 150 on the discs 71 is ensured by the depressions 151, which fit in the depressions 137 of the discs 71.

The carrying arm 66 with the parts mounted on it is slightly movable with respect to the carrying shaft 69 so that the carrier 66 can tilt relatively to the top end 68 of the carrying shaft 69. The carrying arm 66 is prevented from turning about the rotary shaft 69 by means of the cooperating shapes of the opening 67 and the top end 68 of the carrying shaft 69. The tilting movement of the carrying arm 66 with respect to the carrying shaft 69 occurs when the cutting unit comes into contact with large obstacles such as stones. The cutting unit, formed by the carrying arm 66 and the parts fastened to it, can then slightly deflect by tilting. The energy required to undergo this tilting deflection neutralizes wholly or partly the energy produced by impact of the cutting unit on the obstacle so that damage to the cutting unit is avoided. It is an advantage that the cutting unit can deflect resiliently. For this purpose the cup spring 106 is provided between the carrying arm 66 and the nut 105. This cup spring 106 has a maximum deflection of four millimeters. In the assembled state the cup spring is compressed by about one and a half millimeters. The cup spring tends to hold the carrying arm and hence the cutting unit 3 in the desired position relative to the carrying shaft 69. At maximum compression the cup spring 196 exerts a counter-pressure of about 1500 kilograms. The shape and rigidity of the disc 71 itself is such that it can distort upon impact with large obstacles without damage to the carrying arm 66 with the blades and/or other parts of the machine. Any damaged disc 71 can easily be replaced by a new one on the carrying arm. By fastening the bodies 150 and 135 to the disc 71 its rigidity is increased. When the bodies 150 and 135 are provided on the disc 71 it is particularly important for the cutting units to be resiliently tiltable on the carrying shaft 69 in order to avoid damage in the event of contact between the cutting units and an obstacle. In the event of serious damage, the cutting blades 76 might fly loose of the cutting unit, but they are then captured by the screening fabric 49. The screening fabric 49 will also capture stones or other loose material ejected by the rotation of the cutting units so that this material cannot fly out and damage objects at some distance. The blades 76 themselves are capable of deflection and turn underneath the disc 71. Such turning is limited by the stops 79 in order to prevent the blades 76 from coming into contact with parts of the cutter bar.

At the front of the cutter bar 2, the undersides of the cutting units are protected by the sectorshaped parts 115 of the supporting skids 110. Movement of these sector-shaped parts of the skids in a direction normal to the direction 112 is avoided since the nose 122 fits into the gap 122 between the supporting strips 120 and between the top plate 117 and the bottom plate 119. The supporting skids 110 can be fitted easily by slipping the skids 110 onto the nose 122 and fastening the ends 113 to the wall 70 by the bolts 114. The bolts 114 are at the rear of the cutter bar so that damage to them during travel of the machine in normal operation is practically excluded. In this way the connection of the supporting skids 110 with the cutter bar 2 is satisfactorily protected. The nose 122 and the bolts 114 enable the supporting skids to be readily mounted and permit equally simple removal for repair or replacement.

The sliding shoes 125 prevent undesirably rapid wear of the supporting skids 110. The sliding shoes 125 can be readily replaced when they have become excessively thin. The sliding shoes 125 can easily be fitted on or removed from the underside of the supporting skids by means of the lug 126 fitting in the hole 127 and the bolts 114 which secure the rear of the shoe to the rear of the cutter bar. Again, it is advantageous that the bolts 114 are positioned where they are unlikely to be damaged, while replacement of the sliding shoe 125 can be readily carried out.

The movement of the blades 76 about the projections 75 provided on the blade carrier 72 avoids wear of the bolt 73. The bolt 73 is prevented from turning by engagement of the lugs 78 in the recesses 77 between the projections 75 so that release of the bolts 73 is avoided and screwing of the nut 80 onto the bolt 73 is also facilitated. Since the stop 79 and the blade carrier 72 are formed integrally, the stop 79 is correctly positioned relative to the blade 76 to prevent the blade 76 from turning too far in its movement underneath the disc 71. The blade 76 is thus prevented from striking parts of the cutter bar 2. By making the height of the projections 75 slightly larger than the thickness of the blades 76, free rotation of the blades is ensured. Jamming of the blades between the blade carriers and the head of the bolt 73 is thus avoided, while mounting of the blades is facilitated.

The axial forces exerted by the gear wheel 86 on the bearings 89 when the cutting units are driven, can be satisfactorily transferred through the spacer rings 93 to the ring 91 utilize as desired. Since it is possible to thicker or thinner spacer rings 93, correct location of the gear wheel 80 with respect to the gear wheel 85 is facilitated. When the cutting unit and the carrying shaft 69 with the gear wheel 85 fastened on it are driven in a sense opposite that of the gear wheel 85 of FIG. 8, the sleeve 87 is fitted so that the gear wheel 85 will be nearer the bearings 88. The spacer rings 93 are then provided at the bearing 88 in order to transfer the axial forces exerted by the gear wheel 86 to the respective supporting ring 91. The inclination of the channel 107 in the shaft 69 results in a sufficiently light centrifugal force on any parts of this channel to ensure that the channel 107 is unlikely to become clogged, so keeping the space in the wall 70 in communication with the open air. Consequently the lubricants and air in the interior of the housing 5 can readily expand and contract. The alignment rings 95 bridging adjoining edges of the intermediate pieces 4 and the drive housings 5 or of the closing piece 94 and the outermost housing 5 improve the rigidity of the cutter bar 2. The parts 4 and 5 which mainly constitute the cutter bar 2 are pressed towards one another by the tension in the tie rod 6. This stress can be adjusted by means of the nut 182 at the end of the tie rod, the end of the tie rod 6 in the gearbox 24 being axially fixed.

In order to protect vital parts of the machine against obstacles, the protective bar so is mounted on the outer side of the screening fabric 149. The bar 50 protects persons standing too near to the end of the cutter bar against contact with the cutting units For the purposes of shipping the machine, the carrying frame 1 is designed so that it can be turned through about 180° with respect to the cutter bar 2 about the centerline of the shaft 25. To this end, forked arms 18 and 21 are spaced apart by a distance exceeding the width of the gearbox 24 and the housing 23. The forked arms 18 and 21 have furthermore such a length that the housing 23 is a distance 187 from the strip 20 and the arm 16 can be turned over the top of the gearbox 24. The carrying arm 16 with the frame beam 15 fastened to it can be moved into the position shown in FIG. 13. To effect this turn of the carrying arm 16 with respect to the cutter bar 2, the fastening trestle 10 is disengaged from the bar 2. Moreover, the shear mechanism is removed from the trestle 10. In order to put the mowing machine in the crate 186, the protective bar 50 is removed from the screening fabric carrier 45. The fabric screen 49 is removed from the rails 48 and 47 and the rails 47 and 48 are removed from the carrier 45. The carrier 45 is removed from the gear wheel box by releasing the top plate 42 and the side plate 43. The cylinder 57 with the segment 56 is detached from the pin 55. Otherwise all parts can remain on the mowing machine, and the remaining parts fastened to the carrying frame 1 can remain in place. The transmission gear formed by the pulleys 31 and 32 and the protecting casing 35 can also remain fastened to the carrying frame 1. Also the spring 36 can remain fastened to the carrying beam 16 and the frame beam 15.

When the cutter bar 2 and the cutting members 3 fastened thereto are put in the crate 186, the carrying beam 16 being tilted over, the rails 47 and 48 can be disposed along an upright side of the crate. The fabric screen 49 can be put along a short side of the crate. The trestle 10 can be put at one end of the tilted-over carrying beam 16 with the frame beam 15 as shown in FIG. 13. The inner skid 165 can be disconnected from the gear box 24 and be arranged in the crate 186. Thus the crate 186 need not have a length much greater than the length 189 corresponding to the length of the cutter bar 2 and the gear boxes 23 and 24 fastened to it. The width of the crate need not be much larger than than the diameter 194 of the cutting members. The height 191 of the crate 186 is about twice the height of the gear box 24. In this way the mowing machine can be packed in a relatively small space, which facilitates shipping.

Although various features of the mowing machine have been described, and are illustrated in the drawings will be set forth in the following claims as inventive features, the invention is not necessarily limited to these features and may encompass all inventive features disclosed been described both individually and in various combinations.

Having disclosed our invention, what we claim as new and to be secured by Letters Patent of the United States is:

1. A drive housing for a mowing machine comprising; a sealed outer wall which contains an input drive shaft, an output carrying shaft, and means for transferring the power from said drive shaft to said carrying shaft wherein the drive housing accomodates a sleeve which is coupled with said drive shaft and has a bevel gear wheel, said sleeve bearing axially, under forces imposed by the bevel wheel gear when a cutting unit is driven, on a supporting ring through as least one spacer ring, said supporting ring being rigidly secured in the drive housing.

2. A drive housing for a mowing machine as claimed in claim 1, wherein said carrying shaft on which said cutting unit is mounted has a channel communicating between a space in said drive housing and ambient surroundings, a lower end of said channel opening into said space in said drive housing and an opposite, upper end opening into a further space located below a disc that provides an upper covering for said cutting unit, said further space not hermetically sealed from said ambient surroundings.

3. A drive housing for a mowing machine as claimed in claim 2 wherein said channel in said carrying shaft is disposed at an angle to said carrying shaft's axis of rotation.

4. A drive housing for a mowing machine as claimed in claim 2 wherein said lower end of said channel in said carrying shaft is closer to said axis of rotation than is said opposite, upper end.

5. A drive housing for a mowing machine as claimed in claim 2 comprising a cup ring which defines part of said further space and covers the opening to said channel therein.

6. A drive housing for a mowing machine comprising an outer wall which is configured to receive and contain an input drive shaft, an output drive shaft for operating a cutting unit of the mowing machine, means for transferring power from said input drive shaft to said output drive shaft, said output drive shaft extends upwardly from the drive housing and receiving at its upper aspect a ring member, pressure venting channel means extending through said output drive shaft from the interior of the housing into a space under said ring member which is not sealed with respect to the ambient pressure outside the housing, said pressure venting channel providing the only passage for the intake and output of air between the interior of the housing and air at ambient pressure outside the housing, said ring member protecting said pressure venting channel means from dust or similar particulate matter.

* * * * *